United States Patent
Wang et al.

(10) Patent No.: US 7,733,444 B2
(45) Date of Patent: Jun. 8, 2010

(54) STRUCTURE OF A DISPLAY PANEL

(75) Inventors: Yi Hua Wang, Tainan County (TW); Wei Hsiao Chen, Tainan County (TW); Shu Chan Hsiao, Tainan County (TW)

(73) Assignee: Himax Display, Inc., Tainan County (TW)

( * ) Notice: Subject to any disclaimer, the term of this patent is extended or adjusted under 35 U.S.C. 154(b) by 182 days.

(21) Appl. No.: 12/020,255

(22) Filed: Jan. 25, 2008

(65) Prior Publication Data

US 2008/0291374 A1 Nov. 27, 2008

(30) Foreign Application Priority Data

May 22, 2007 (TW) .............................. 96118111 A

(51) Int. Cl.
*G02F 1/1333* (2006.01)
*G02F 1/1335* (2006.01)

(52) U.S. Cl. ........................... 349/106; 349/40; 349/44; 349/111

(58) Field of Classification Search ................ None
See application file for complete search history.

(56) References Cited

U.S. PATENT DOCUMENTS 7,315,342 B2 * 1/2008 Kuo et al. ................... 349/152
2002/0057396 A1 * 5/2002 Tsubo ......................... 349/43

FOREIGN PATENT DOCUMENTS

JP 08-054631 A 2/1996

* cited by examiner

*Primary Examiner*—Tina M Wong

(57) ABSTRACT

Residual direct-current charges may be accumulated and distributed non-uniformly on the built-in color filters in a displaying panel such as the liquid-crystal-on-silicon displaying device, and thus results in the non-uniformity of the internal electric field that controls the arrangement of liquid crystal molecules. To reduce residual direct-current charges so as to cause the internal electric field to be substantially uniform, the present invention provides a structure of the display panel including a plurality of shields for respectively enclosing a plurality of color filters, wherein each shield is connected to a corresponding pixel electrode by a conductive wire.

11 Claims, 2 Drawing Sheets

STRUCTURE OF A DISPLAY PANEL

CROSS REFERENCE TO RELATED APPLICATION

This application claims the priority benefit of Taiwan Patent Application Serial Number 096118111, May 22, 2007, the full disclosure of which is incorporated herein by reference.

BACKGROUND OF THE INVENTION

1. Field of the Invention

The present invention relates to a structure of a display panel, and more particularly to a structure of a liquid-crystal-on-silicon (LCoS) panel.

2. Description of the Related Art

Residual direct current (DC) charges are a problem to be solved in liquid crystal displaying devices, wherein the residual DC charge results from the accumulation of ions on pixels of the liquid crystal displaying devices. For example, in the conventional twisted-nematic-type liquid crystal display (LCD) devices, DC charges are accumulated in the interface of the alignment layer of each pixel. The resultant residual DC voltage causes liquid crystal disposed across the region between the pixels and the transparent electrodes to result in the after-image phenomenon. Methods for solving this problem such as using a low-resistance alignment layer have been disclosed, for example, in Japanese Patent Application Laid-Open No. 8-54631.

For liquid-crystal-on-silicon (LCoS) displaying devices, the problem of DC charges may become more serious than that of the twisted-nematic-type LCD devices. The ions are easily accumulated on the pixels due to the different work functions of the different kinds of electrode, e.g., indium tin oxide (ITO) transparent electrode and aluminum (Al) reflective electrode. In particular, when pixelized color filters (i.e. patterning color filters on the chip) are performed in the LCoS panel, DC charges may be non-uniformly distributed on the built-in color filters (CFs) so as to lead to the non-uniformity of an internal electric field and thus cause the liquid crystal molecules to be incompletely rotated. The situation leads to defects such as mura.

FIG. 1 shows a part of structure of a conventional LCoS panel 10. The LCoS panel 10 includes a silicon (Si) substrate 12, a glass substrate 14, a liquid crystal layer 16 and a plurality of CFs 18, wherein DC charges may be distributed non-uniformly on the CFs 18 due to the accumulation of ions. As shown in FIG. 1, the CFs 18 are respectively disposed over a plurality of sub-pixels 20 which are corresponding to the CFs 18 respectively and disposed over the Si substrate 12. Each sub-pixel 20 includes a metal interconnection layer 22, a reflective mirror 24, a protective layer 26 and an anti-reflective layer 28, wherein the metal interconnection layer 22, the reflective mirror 24, the protective layer 26 and the anti-reflective layer 28 and the corresponding CF 18 are disposed on the Si substrate 12 in sequence. FIG. 1 also shows that an insulating layer 30 is disposed on the CFs 18; a plurality of spacing layers 32 are formed between the adjacent sub-pixels 20 and between the adjacent CFs 18; an alignment layer 34 is disposed between the liquid crystal layer 16 and the insulating layer 30; and a plurality of transparent electrodes 36 (only one transparent electrode is viewed in this cross-section shown in FIG. 1) are disposed between the glass substrate 14 and the liquid crystal layer 16.

Nowadays, the LCoS technology integrates an LCD technology with single-crystal Si-based very-large-scale-integration (VLSI) circuits. Compared with the LCD device manufactured by a thin-film transistor (TFT) technology, the LCoS displaying devices is cost-effective. Accordingly, it is worthy to have an innovation on the reduction of the residual DC charges on the CFs in the LCoS displaying devices.

SUMMARY OF THE INVENTION

It is one object of the present invention to provide a structure of a liquid-crystal display panel, wherein the DC charges on the built-in CFs can be reduced so that the internal electric field is substantially uniform for excellently controlling the arrangement of liquid crystal molecules therein.

It is another object of the present invention to provide a structure of LCoS devices, wherein the DC charges on the built-in CFs can be reduced so that the internal electric field is substantially uniform for excellently controlling the arrangement of liquid crystal molecules therein.

To fulfill the objects of the present invention, a plurality of shields are used for respectively enclosing a plurality of built-in CFs in the display panel such as the LCoS device, wherein each shield is connected to the corresponding pixel electrode by a conductive wire.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
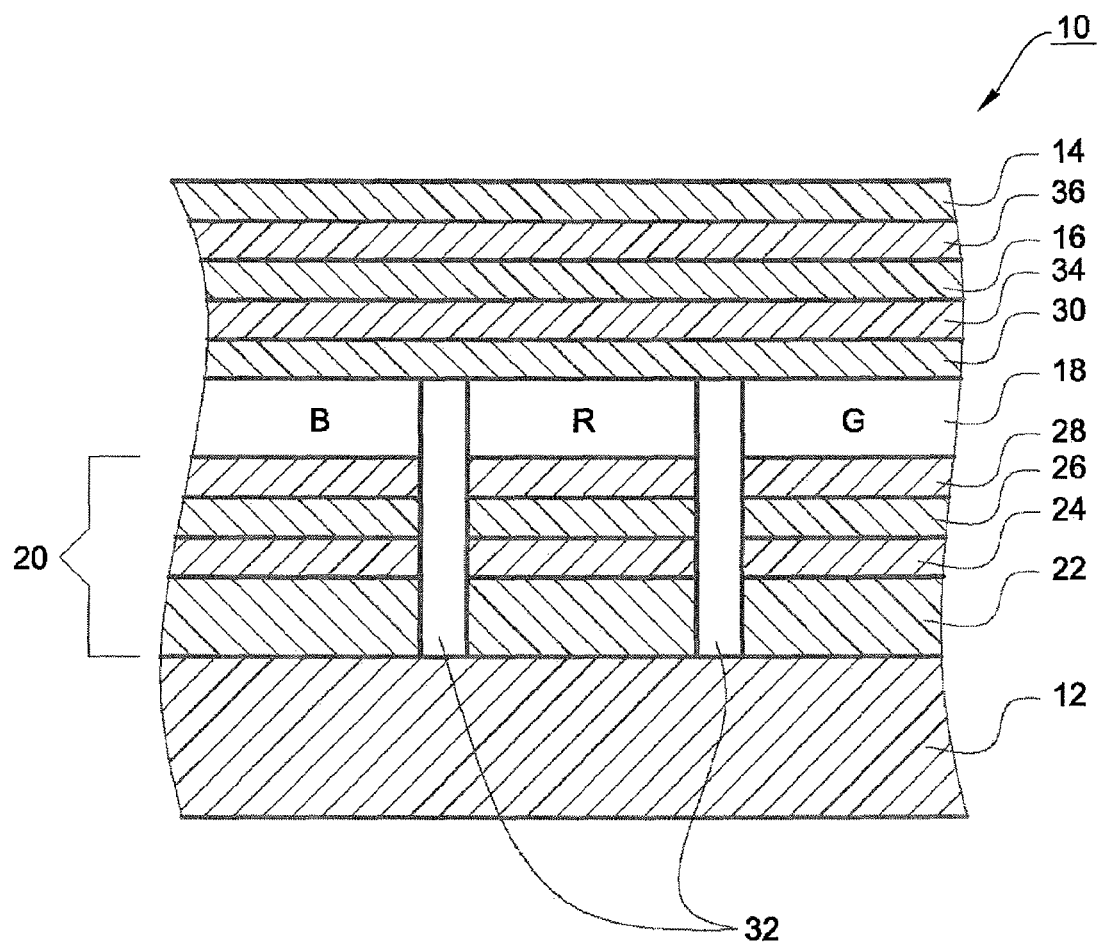
FIG. 1 shows a partial cross-sectional schematic view of a conventional LCoS panel.
Figure 2:
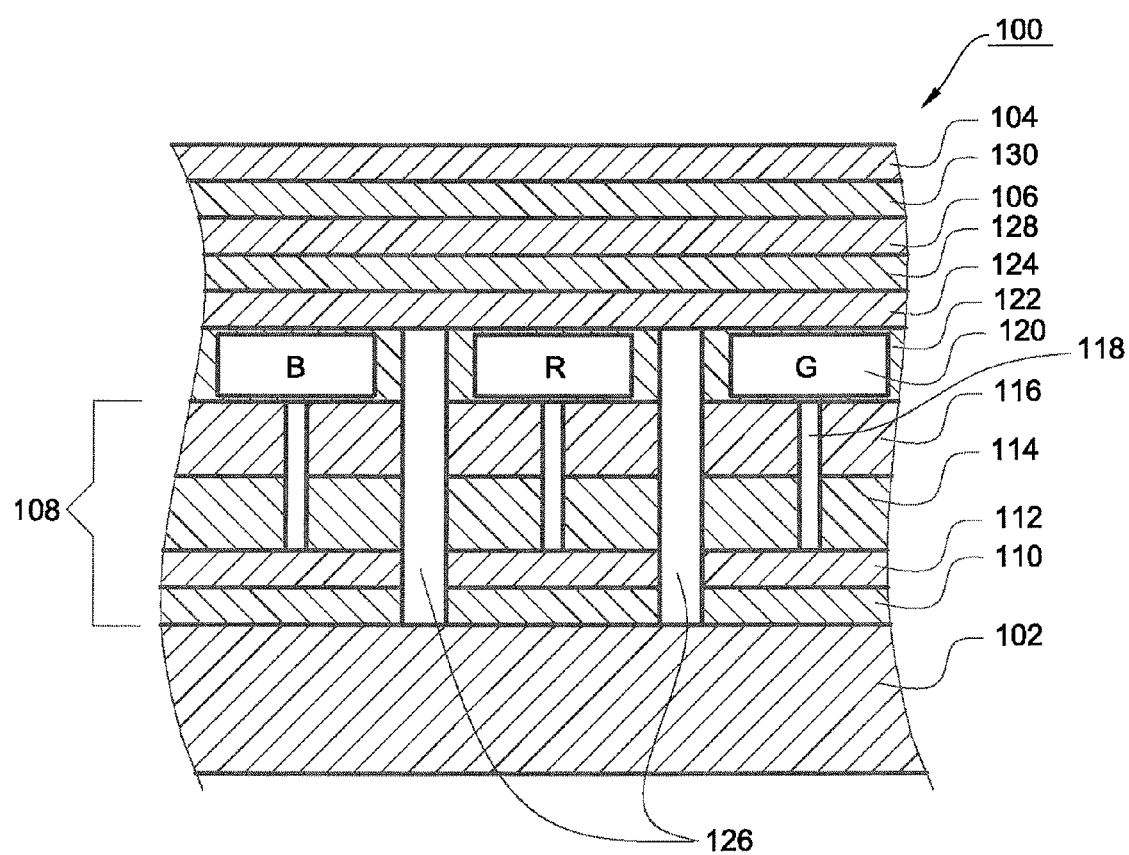
FIG. 2 shows a partial cross-sectional schematic view of an LCoS panel according to an embodiment of the present invention.

FIG. 2 shows the structure of a liquid-crystal-on-silicon (LCoS) panel 100 according to one embodiment of the present invention. The LCoS panel 100 includes a silicon (Si) substrate 102; a glass substrate 104 opposite to the Si substrate 102; a liquid crystal layer 106 disposed between the Si substrate 102 and the glass substrate 104; a plurality of sub-pixels 108 disposed over the Si substrate 102, wherein each sub-pixel 108 includes a metal interconnection layer 110, a reflective mirror 112, an protective layer 114 and an anti-reflective layer 116 which all are disposed on the Si substrate 102 in sequence, the reflective mirror 112 is coupled to the Si substrate 102 by the metal interconnection layer 110, and each sub-pixel 108 further includes a wire 118 disposed on the reflective mirror 112 and passing through the protective layer 114 and the anti-reflective layer 116; a plurality of color filters (CFs) 120 respectively disposed over the sub-pixels 108 which are corresponding to the CFs 118 respectively; a plurality of shields 122 which enclose the corresponding CFs 120 respectively for separating each CF 120 from the adjacent medium layers (e.g. the anti-reflective layer 116, etc), wherein each shields 122 is connected to the corresponding reflective mirror 112 by the corresponding wire 118; an insulating layer 124 disposed on the CFs 120; a plurality of spacing layers 126 formed between the adjacent sub-pixels 20 and between the adjacent CFs 120; an alignment layer 128 disposed between the liquid crystal layer 106 and the insulating layer 124; and a plurality of transparent electrodes 130 (only one transparent electrode is viewed in this cross-section shown in FIG. 2) disposed between the glass substrate 104 and the liquid crystal layer 106 and coupled to the glass substrate 104.

As described by the conventional LCoS technology, the reflective mirror 112 is provided to act as the pixel electrode and characterized to have the reflective mode of light transmission. In one embodiment of the present invention, the reflective mirror 112 is made of reflective material, e.g. aluminum (Al). In the Si substrate 102 together with the metal interconnection layer 110 (the silicon is a single-crystal (s-Si)), there are built-in transistors for controlling the pixel electrode thereon.

Referring to FIG. 2 again, the CFs 120 are aligned with the sub-pixels 108 respectively, integrated with the sub-pixels 108 and disposed in the LCoS panel 100 (by a coating manner). Each CF 120 has a specific primary color. The structure of LCoS panels 100 has the CFs 120 enclosed by the shields 122 respectively, and each shield 122 is connected to the corresponding reflective mirror 112 (i.e., reflective electrode or pixel electrode) of the sub-pixels 108 by the wire 118. The wire 118 can be made of conductive material, e.g. aluminum (Al).

In one embodiment of the present invention, the shields 122 are made of indium tin oxide (ITO). The ITO is an electrically conductive material having good conductivity and transparency, and thus can provide CFs 120 with the electrostatic shielding that no electric-field lines passes through the CFs 120 substantially. The wires 118 made of Al can prevent the corresponding CF 120 from the floating of voltage by electrically connecting the corresponding shield 122 to the corresponding reflective mirror 112, so that the corresponding CF 120 is unaffected by the voltages difference between the adjacent CFs 120. Thus, the residual DC charges are reduced and the electric field between the CFs 120 and the transparent electrodes 130 are kept uniformly.

The typical materials used for the other components of the LCoS panel 100 is described as follows: the titanium nitride (TiN) is used for the metal interconnection layer 110; the silicon oxide (SiO2) is used for the protective layer 114; the silicon nitride (Si3N4) is used for the anti-reflective layer 116; the SiO2 is used for the insulating layer 124; the SiO2 is used for the spacing layers 126; the polyimide is used for the alignment layer 128; and ITO is used for the transparent electrodes 130. Nevertheless, one or more materials described above can be replaced with suitable materials.

Although particular embodiments of this invention have been described for illustration, one skilled in the art will appreciate that various modifications and enhancements may be made without departing from the spirit and scope of the invention. The presently disclosed embodiments are therefore to be considered in all respects as illustrative and not restrictive, and the scope of the invention should be defined by the appended claims, not limited to the foregoing descriptions.

What is claimed is:

1. A display panel comprising:
   a first substrate;
   a second substrate opposite to the first substrate;
   a plurality of pixel electrodes coupled to the first substrate;
   a liquid crystal layer disposed between the pixel electrodes and the second substrate;
   a plurality of color filters disposed over the corresponding pixel electrodes respectively; and
   a plurality of electrically conductive shields enclosing the corresponding color filters respectively;
   wherein the shields are made of transparent material.

2. The display panel of claim 1, further comprising a plurality of wires for respectively connecting the shields to the corresponding pixel electrodes.

3. The display panel of claim 2, wherein the wires are made of conductive material.

4. The display panel of claim 1, wherein the pixel electrodes are made of reflective material.

5. The display panel of claim 1, wherein the shields are made of indium tin oxide (ITO).

6. A liquid-crystal-on-silicon panel comprising:
   a silicon substrate;
   a glass substrate opposite to the silicon substrate;
   a plurality of reflective electrodes coupled to the silicon substrate;
   a plurality of transparent electrodes coupled to the glass substrate;
   a liquid crystal layer disposed between the reflective electrodes and the transparent electrodes;
   a plurality of color filters disposed over the corresponding reflective electrodes respectively; and
   a plurality of electrically conductive shields enclosing the color filters respectively;
   wherein the shields are made of transparent material.

7. The liquid-crystal-on-silicon panel of claim 6, further comprising a plurality of wires for respectively connecting the shields to the corresponding reflectively electrodes.

8. The liquid-crystal-on-silicon panel of claim 7, wherein the wires are made of aluminum (Al).

9. The liquid-crystal-on-silicon panel of claim 6, wherein the reflective electrodes are made of aluminum (Al).

10. The liquid-crystal-on-silicon panel of claim 6, wherein the transparent electrodes are made of indium tin oxide (ITO).

11. The liquid-crystal-on-silicon panel of claim 6, wherein the shields are made of indium tin oxide (ITO).

* * * * *